Patented Oct. 24, 1933

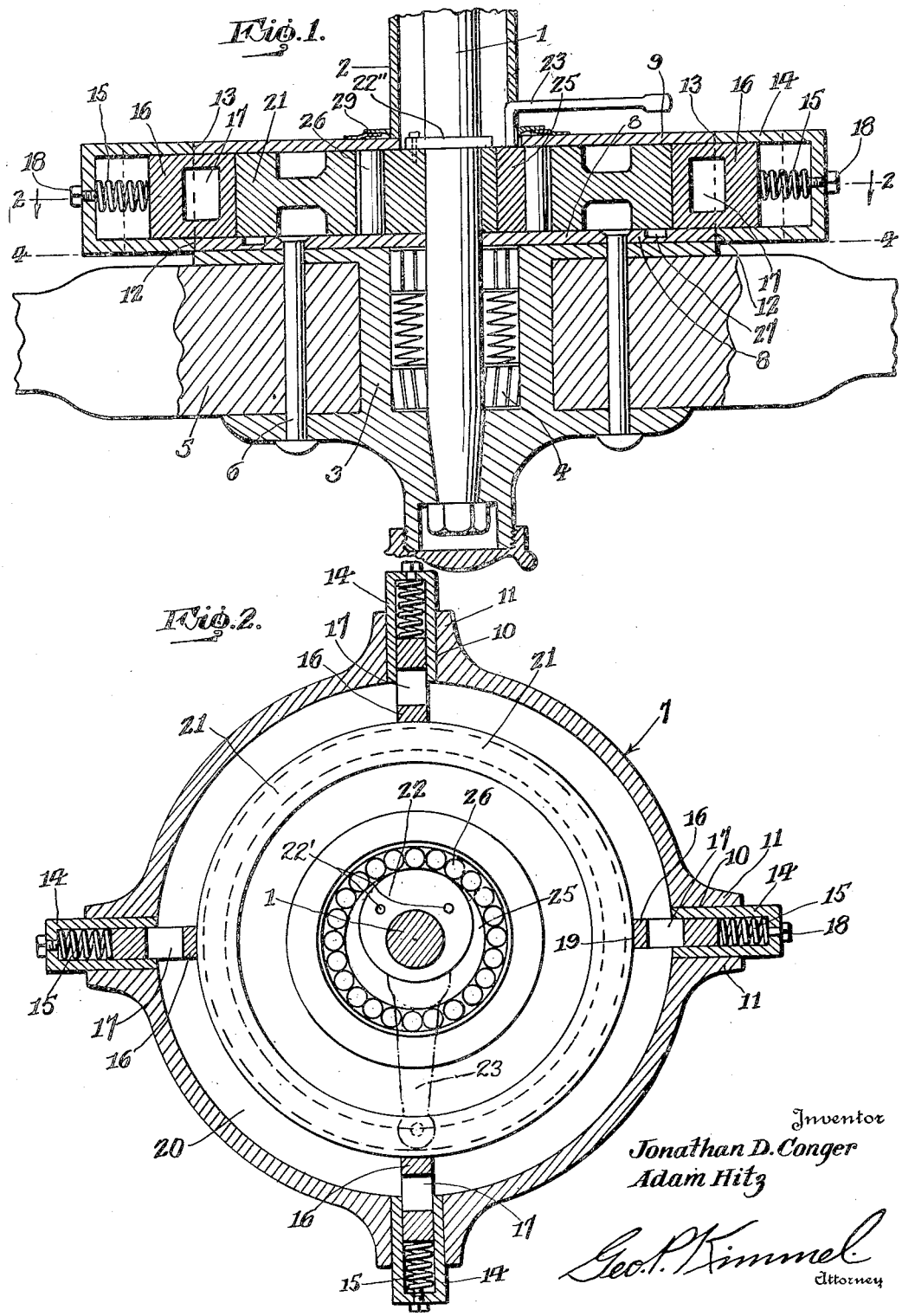

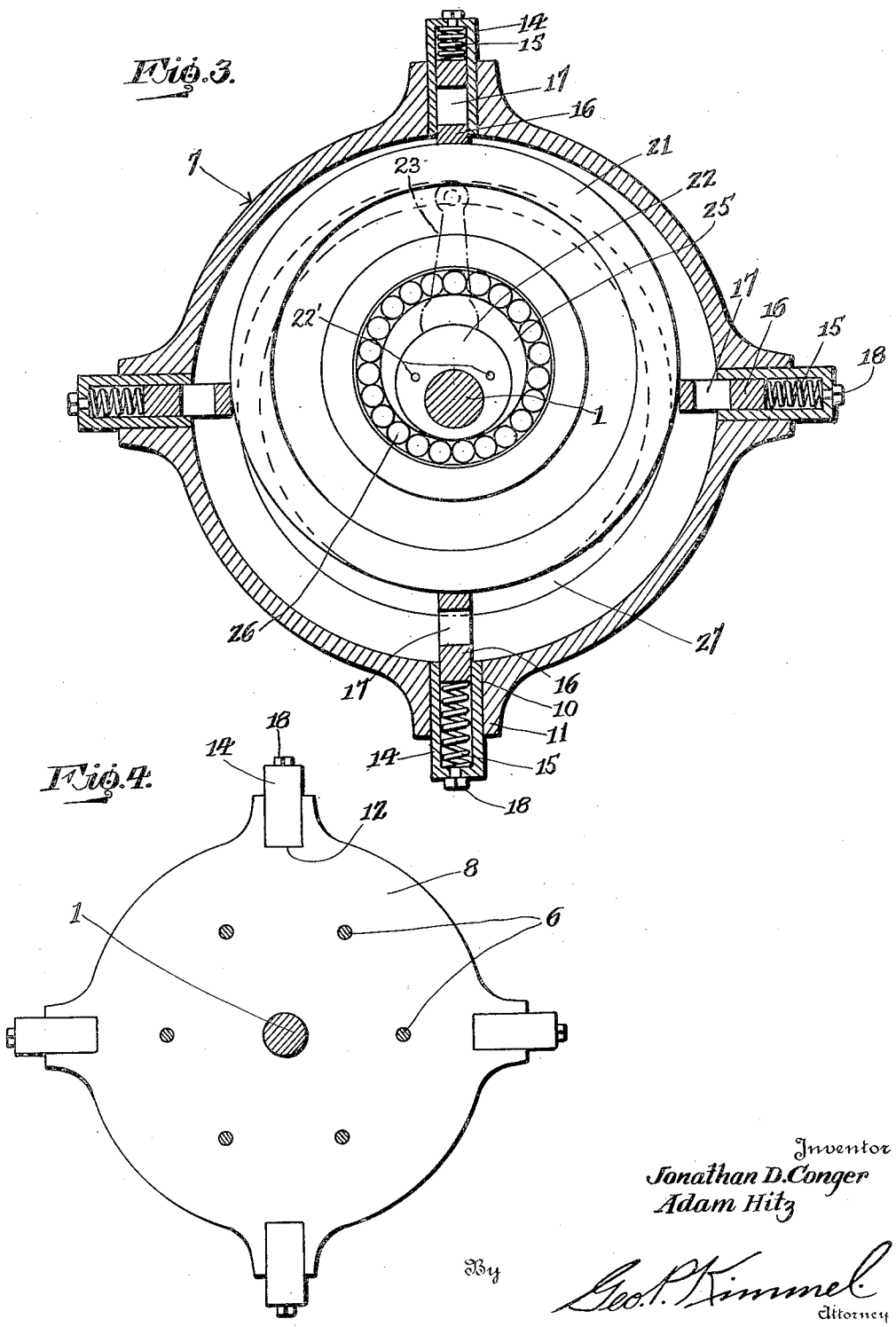

1,932,334

UNITED STATES PATENT OFFICE 1,932,334

HYDRAULIC BRAKE

Jonathan D. Conger and Adam Hitz, Clarkston, Wash., assignors of one-fourth to O. D. Shook, Lewiston, Idaho, and one-fourth to J. R. Adkison, Clarkston, Wash.

Application April 14, 1931. Serial No. 530,087

7 Claims. (Cl. 188—90)

This invention relates to a hydraulic brake designed primarily for use in connection with the wheels of automotive vehicles, but it is to be understood that a hydraulic brake, in accordance with this invention is for employment in any connection for which it may be found applicable, and the invention has for its object to provide, in a manner as hereinafter set forth, a brake of such class capable of being conveniently operated to provide a thoroughly efficient and positive braking action upon a revolving body without the necessity of depending in any manner whatsoever upon a friction action between coacting braking elements.

Further objects of the invention are to provide, in a manner as hereinafter set forth, a hydraulic brake for the purpose referred to which is simple in its construction and arrangement, strong, durable, compact, readily installed with respect to a wheel of an automotive vehicle, positive in its action, thoroughly efficient in use, conveniently operated, obtaining greater leverage than the forms of hydraulic brakes now in general use for the same purpose for which the applicants' invention is intended, so set up as to have the leverage against the axle upon which the wheel carrying the brake is mounted when applying the braking fluid, and inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the invention as claimed.

In the drawings wherein like reference characters denote corresponding parts throughout the several views:

Figure 1 is a sectional plan of a hydraulic brake in accordance with this invention as applied to the wheel of an automotive vehicle, with the wheel being illustrated fragmentary.

Figure 2 is a vertical sectional view of a hydraulic brake in accordance with this invention on line 2—2 Figure 1 and with the brake in neutral position.

Figure 3 is a view similar to Figure 2 showing the brake in applied position.

Figure 4 is a section on line 4—4 Figure 1.

Referring to the drawings in detail a non-rotatable axle spindle is indicated at 1, a spindle housing at 2, a wheel hub at 3 and which is revolubly mounted upon spindle 1, a bearing at 4 for the hub 3, wheel spokes at 5 and holdfast means at 6 for securing the spokes 5 to the hub 3.

Fixedly secured against the inside of the hub 3 by the holdfast devices 6 is an annular drum including a body portion 7, an outer head 8 and an inner head 9. The heads 8 and 9 have their outlines conform to the outline of body portion 7, and the latter is provided with equidistant spaced openings 10 and by way of example it is shown as formed with four openings 10. The body portion 7 is furthermore formed with four pairs of protuberances 11 projecting outwardly from the outer face thereof. The protuberances of each pair are arranged in parallel spaced relation and the inner faces of the protuberances form continuations of the walls of the openings 10. Preferably the head 8 will be integral with the body portion 7 and is formed with notches 12 of the same contour as openings 10. The inner wall of each notch 12 is flush with the inner end of an opening 10. The head 9 is set up with four notches 13 which register with the openings 10 and the inner wall of each notch is flush with the inner end of an opening 10. Preferably the head 9 will be detachably secured to the body portion 7. The edges of the heads 8, 9 are flush throughout with the outer periphery of body portion 7 and as before stated each head corresponds in contour to that of the body portion 7. It will furthermore be understood that the heads 8, 9 and body portion 7 can be set up in any desirable manner, that is to say head 9 may be integral with body portion 7, or the body portion 7 formed of four sections and detachably secured to heads 8, 9.

Extending into each opening 10, flush at its inner end with the inner face of body portion 7 and abutting the inner ends of a notch 12 and 13 is a casing 14 which is open at its inner end. The casings 14 are fixedly secured in position, preferably by welding. Positioned within the casing is a coiled controlling spring 15 for a radially disposed abutment 16 formed with a by-pass opening 17. An adjusting screw 18 is carried by the casing 14 for adjusting the tension of the spring 15. The spring 15 is interposed between the outer end of the abutment 16 and the outer end of casing 14. The inner end 19 of abutment 16 is of arcuate contour.

The drum is adapted to contain a body of fluid, preferably oil and the abutments 16 divide the chamber 20 provided by the drum into four compartments. The abutments 16 form the end walls of the compartments.

Arranged within the chamber 20 is an annulus 21 which normally is in concentric spaced relation to the body portion 7 of the drum. Mounted upon the spindle 1 is a stationary inner eccentric 22. Holdfast means for maintaining the eccentric stationary is indicated at 22' and which are attached to the eccentric and also to a flange 22'' on spindle 1. Mounted on and shiftable relative to eccentric 22 is an outer eccentric 25, the latter is also shiftable relative to annulus 21 and is capable of being moved in a direction about eccentric 22 to shift annulus 21 to an eccentric position with respect to body portion 7 of the drum. The normal position of eccentric 25 is as shown in Figure 2, but when shifted from normal, its position will be as shown in Figure 3.

Interposed between annulus 21 and eccentric 25 are bearing rollers 26. An angle shaped shifting arm 23 is provided for eccentric 25. The arm 23 is to be connected to a suitable operating means therefor, not shown. The head 9 is slotted, as at 24 for the passage of arm 23. The annulus when in normal position revolves with the drum upon the bearing rollers 26, but when shifted from normal its revolving movement is arrested.

The inner face of head 8 is formed with an endless groove 27 which is closed when the annulus 21 is in concentric position with respect to the axle spindle 1. See Figure 2. The groove 27 provides a by-pass between the compartments of chamber 20 provided by the abutments 16 when annulus 21 is shifted to an eccentric position with respect to axle 1. See Figure 3. The head 9 and housing 2 are provided with coacting means, as at 29 for retaining the oil in the drum and to keep foreign substances from entering the latter.

The abutments 16, annulus 21, eccentric 22, eccentric 25 and bearing rollers 26 extend from the inner face of head 8 to the inner face of head 9 and have a snug sliding fit with such faces. The holdfast means 6 is counter-sunk in the inner face of head 8.

When the eccentric 25 is shifted from its neutral position shown in Figure 2 it throws the annulus 21 towards the drum. When the annulus 21 is thrown out of its neutral position shown in Figure 2 and towards the drum, one of the abutments picks up the fluid or oil, that is in the space between the drum and annulus and compresses it against the drum when the annulus is closing to retard or arrest the revolving of the drum to provide a braking action on the drum. The nearer one places the annulus towards the drum the more pressure accumulates and when the pass is completely stopped, the brake will lock.

The groove 27 which forms a by-pass prevents the fluid or oil effecting the annulus in its movement towards the drum and if the groove was not employed the pressure of fluid or oil would be equal in all four compartments so the pressure would be the same, but the by-pass provided by the groove allows the volume of oil to go to the point of least resistance.

The brake in accordance with this invention is designed to eliminate the employment of brakes of the friction type. The principle of the brake in accordance with this invention is simple, positive, will wear the life of the vehicle, will not need adjustment, and the only attention required is once in a while to check on the oil or fluid within the drum. The brake will not grab, heat, requires no lining, does not create any friction, and the wheel to which it is attached is always in balance.

What we claim is:

1. A hydraulic brake comprising, a revoluble drum adapted to contain a body of fluid and to be fixed to a wheel revolving about an axle spindle, an annulus within, normally disposed concentrically to and normally revolving with said drum, spring controlled abutments carried by the drum and permanently engaging the outer edge of the annulus, said abutments dividing, in connection with the annulus the interior of the drum into a plurality of communicating compartments, a stationary inner eccentric adapted to be positioned on the axle spindle, and a shiftable outer eccentric interposed between the inner eccentric and annulus, seated upon the inner eccentric and providing when shifted in one direction relative to the inner eccentric moving said annulus towards the drum to compact the fluid thereby arresting the revolving movement of the drum.

2. A hydraulic brake comprising, a revoluble drum adapted to contain a body of fluid and to be fixed to a wheel revolving about an axle spindle, an annulus within, normally disposed concentrically to and normally revolving with said drum, spring controlled abutments carried by the drum and permanently engaging the outer edge of the annulus, said abutments dividing, in connection with the annulus the interior of the drum into a plurality of communicating compartments, a stationary inner eccentric adapted to be positioned on the axle spindle, and a shiftable outer eccentric interposed between the inner eccentric and annulus, seated upon the inner eccentric and providing when shifted in one direction relative to the inner eccentric moving said annulus towards the drum to compact the fluid thereby arresting the revolving movement of the drum, said drum including a pair of heads, one of said heads formed on its inner face with an endless groove closed by the annulus when the latter is in normal position and providing a by-pass when the annulus is shifted from normal position.

3. A hydraulic brake comprising, a revoluble drum adapted to contain a body of fluid and to be fixed to a wheel revolving about an axle spindle, an annulus within, normally disposed conconcentrically to and normally revolving with said drum, spring controlled abutments carried by the drum and permanently engaging the outer edge of the annulus, said abutments dividing, in connection with the annulus the interior of the drum into a plurality of communicating compartments, a stationary inner eccentric adapted to be positioned on the axle spindle, a shiftable outer eccentric interposed between the inner eccentric and annulus, seated upon the inner eccentric and providing when shifted in one direction relative to the inner eccentric moving said annulus towards the drum to compact the fluid thereby arresting the revolving movement of the drum, and each of said abutments having a by-pass opening.

4. In a hydraulic brake for a hollow revolving element carrying a body of fluid, means within said element for compacting the fluid against the latter for arresting the revolving of the element, said means including an annulus disposed normally in concentric spaced relation to and normally bodily revolving with said element, bearing means arranged against the inner edge of the annulus, a permanently stationary inner eccentric, and a normally stationary shiftable outer eccentric interposed between said bearing means and said inner eccentric, seated on the latter and providing when shifted in one direction to bodily move said annulus towards said elements for compacting the fluid.

5. In a hydraulic brake, the combination with a hollow revolving element containing a body of fluid and adapted to be secured to and bodily revolving with the object to be braked, of means within said element for compacting the fluid against the latter for arresting the revolving movement of said element, said means including an annulus disposed normally in concentric spaced relation to and normally bodily revolving with said element, a permanently stationary inner eccentric, and a normally stationary, oppositely shiftable outer eccentric encompassed by said annulus, seated on and shiftable upon said inner eccentric and providing when shifted in one direction to bodily move said annulus towards said element for compacting the fluid.

6. In a hydraulic brake, the combination with a hollow revolving element containing a body of fluid and adapted to be secured to and bodily revolving with the object to be braked, of means within said element for compacting the fluid against the latter for arresting the revolving movement of said element, said means including an annulus disposed normally in concentric spaced relation to and normally bodily revolving with said element, a permanently stationary inner eccentric, a normally stationary, oppositely shiftable outer eccentric encompassed by said annulus, seated on and shiftable upon said inner eccentric and providing when shifted in one direction to bodily move said annulus towards said element for compacting the fluid, and spaced spring controlled apertured members slidably carried by said element, abutting said annulus to provide for the normal revolving of the latter with said element and coacting with the annulus to divide said element into a plurality of communicating compartments.

7. In a hydraulic brake, the combination with a hollow revolving element containing a body of fluid and adapted to be secured to and bodily revolving with the object to be braked, of means within said element for compacting the fluid against the latter for arresting the revolving movement of said element, said means including an annulus disposed normally in concentric spaced relation to and normally bodily revolving with said element, a permanently stationary inner eccentric, a normally stationary, oppositely shiftable outer eccentric encompassed by said annulus, seated on and shiftable upon said inner eccentric and providing when shifted in one direction to bodily move said annulus towards said element for compacting the fluid, spaced spring controlled apertured members slidably carried by said element, abutting said annulus to provide for the normal revolving of the latter with said element and coacting with the annulus to divide said element into a plurality of communicating compartments, and said element formed with an endless groove closed by the annulus when the latter is in normal position, said groove providing a bypass for the fluid when the annulus is shifted from normal position.

JONATHAN D. CONGER.
ADAM HITZ.